United States Patent
Tsukada et al.

(10) Patent No.: US 12,404,373 B2
(45) Date of Patent: *Sep. 2, 2025

(54) THERMALLY CONDUCTIVE SILICONE COMPOSITION AND THERMALLY CONDUCTIVE SILICONE SHEET

(71) Applicant: Shin-Etsu Chemical Co., Ltd., Tokyo (JP)

(72) Inventors: Junichi Tsukada, Annaka (JP); Takanori Ito, Annaka (JP); Akihiro Endo, Annaka (JP); Megumi Miyano, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 46 days.

This patent is subject to a terminal disclaimer.

(21) Appl. No.: 17/775,173

(22) PCT Filed: Oct. 27, 2020

(86) PCT No.: PCT/JP2020/040173
§ 371 (c)(1),
(2) Date: May 6, 2022

(87) PCT Pub. No.: WO2021/095507
PCT Pub. Date: May 20, 2021

(65) Prior Publication Data
US 2022/0403113 A1    Dec. 22, 2022

(30) Foreign Application Priority Data

Nov. 14, 2019  (JP) .................................. 2019-205901

(51) Int. Cl.
| | | |
|---|---|---|
| *C08G 77/20* | (2006.01) | |
| *C08G 77/08* | (2006.01) | |
| *C08G 77/12* | (2006.01) | |
| *C08G 77/18* | (2006.01) | |
| *C08J 5/18* | (2006.01) | |
| *C08K 3/22* | (2006.01) | |
| *C08K 9/06* | (2006.01) | |

(52) U.S. Cl.
CPC ............. *C08G 77/20* (2013.01); *C08G 77/08* (2013.01); *C08G 77/12* (2013.01); *C08G 77/18* (2013.01); *C08J 5/18* (2013.01); *C08K 3/22* (2013.01); *C08K 9/06* (2013.01); *C08K 2003/222* (2013.01); *C08K 2003/2227* (2013.01); *C08K 2201/001* (2013.01); *C08K 2201/005* (2013.01)

(58) Field of Classification Search
CPC ........ C08G 77/20; C08G 77/08; C08G 77/12; C08G 77/18; C08J 5/18; C08J 2383/07; C08J 2483/05; C08J 2483/06; C08K 3/22; C08K 9/06; C08K 2003/222; C08K 2003/2227; C08K 2201/001; C08K 2201/005; C08K 9/08; C08K 2201/014; C08K 5/56; C08L 83/04; C08L 2205/025

See application file for complete search history.

(56) References Cited

U.S. PATENT DOCUMENTS

| | | | |
|---|---|---|---|
| 4,292,225 A | 9/1981 | Theodore et al. | |
| 4,604,424 A | 8/1986 | Cole et al. | |
| 5,352,731 A | 10/1994 | Nakano et al. | |
| 2015/0299550 A1* | 10/2015 | Kusunoki | C08K 3/22 252/75 |
| 2019/0345291 A1* | 11/2019 | Kato | C08L 83/04 |

FOREIGN PATENT DOCUMENTS

| | | |
|---|---|---|
| JP | 47-32400 A | 11/1972 |
| JP | 56-100849 A | 8/1981 |
| JP | 62-184058 A | 8/1987 |
| JP | 1-69661 A | 3/1989 |
| JP | 4-328163 A | 11/1992 |
| JP | 2011-89079 A | 5/2011 |
| JP | 2011-178821 A | 9/2011 |
| JP | 2013-112809 A | 6/2013 |
| JP | 2015-71662 A | 4/2015 |
| WO | WO 2010-103852 | * 12/2010 |
| WO | WO 2016/121563 A1 | 8/2016 |

OTHER PUBLICATIONS

Machine translation of WO 2010-103852, retrieved Aug. 13, 2023.*
International Search Report for PCT/JP2020/040173 mailed on Jan. 12, 2021.
Written Opinion of the International Searching Authority for PCT/JP2020/040173 mailed on Jan. 12, 2021.

* cited by examiner

*Primary Examiner* — Michael B Nelson
(74) *Attorney, Agent, or Firm* — Birch, Stewart, Kolasch & Birch, LLP

(57) ABSTRACT

Provided is a thermally conductive silicone composition that can be turned into a lightweight cured product superior in thermal conductivity, and is easily processable due to its low viscosity. The composition contains:

(A) an organopolysiloxane having at least two alkenyl groups per each molecule;
(B) an organohydrogenpolysiloxane having, per each molecule, at least two hydrogen atoms directly bonded to silicon atoms;
(C) a thermally conductive filler containing magnesium oxide (20 to 40% by mass), aluminum oxide (40 to 60% by mass) and aluminum hydroxide (10 to 30% by mass);
(D) a dimethylpolysiloxane with one end of the molecular chain thereof being blocked by a trialkoxy group;
(E) a platinum group metal-based curing catalyst; and
(F) an addition reaction control agent.

6 Claims, No Drawings

THERMALLY CONDUCTIVE SILICONE COMPOSITION AND THERMALLY CONDUCTIVE SILICONE SHEET

TECHNICAL FIELD

The present invention relates to a thermally conductive material suitable for use in a boundary face between the thermal boundary face of a heat-generating electronic part and a heat dissipation member such as a heatsink or a circuit board, especially for the purpose of cooling such electronic part via thermal conduction.

BACKGROUND ART

LSI chips such as CPUs, driver ICs and memories used in electronic devices such as personal computers, digital videodisks and mobile phones have come to generate large amounts of heat themselves due to their higher performances, speed and integration as well as their reduced sizes; a temperature rise of a chip due to such heat causes malfunction and breakage. Thus, there have been proposed many heat dissipation methods for controlling the temperature rise of a chip in operation; and heat dissipation members used in these methods.

Conventionally, in an electronic device or the like, there is used a heatsink employing a metal plate with a high thermal conductivity, such as an aluminum or copper plate, in order to control the temperature rise of a chip in operation. This heatsink transfers a heat generated by the chip, and then releases it from the surface thereof due to a difference in temperature with outer air.

While the heatsink needs to be in close contact with the chip in order to efficiently transfer the heat generated by the chip to the heatsink, due to the differences in height of each chip and the tolerances resulting from an assembling work, a flexible sheet or a grease is interposed between the chip and the heatsink so as to enable thermal conduction from the chip to the heatsink via such sheet or grease.

A sheet is superior to a grease in handling property; a thermally conductive sheet (thermally conductive silicone rubber sheet) made of a thermally conductive silicone rubber or the like is used in various fields.

In Patent document 1, there is disclosed an insulator composition with 100 to 800 parts by mass of at least one metal oxide selected from beryllium oxide, aluminum oxide, hydrated aluminum oxide, magnesium oxide and zinc oxide being added to 100 parts by mass of a synthetic rubber such as a silicone rubber.

Further, as a heat dissipation material used in areas requiring no insulation properties, Patent document 2 discloses a composition with 60 to 500 parts by mass of a thermally conductive powder such as a silica, silver, gold or silicon powder being added to an addition curable silicone rubber composition.

However, the problems with these thermally conductive materials are such that they all have a low thermal conductivity; and that if they are highly filled with a large amount of a thermally conductive filler in order to improve thermal conductivity, a fluidity will be impaired in the case of a liquid silicone rubber composition, and a degree of plasticity will increase in the case of a millable type silicone rubber composition, which will lead to an extremely poor molding processability in either case.

Here, as a solution to such problem(s), Patent document 3 discloses a highly thermal conductive rubber/plastic composition filled with an alumina consisting of 10 to 30% by mass of alumina particles having an average particle size of not larger than 5 μm; and a remainder which is comprised of spherical corundum particles having an average primary particle size of not smaller than 10 μm and a shape with no cutting edges. Further, Patent document 4 discloses a thermally conductive silicone rubber composition comprised of a base employing both a gum-like organopolysiloxane having an average polymerization degree of 6,000 to 12,000 and an oil-like organopolysiloxane having an average polymerization degree of 200 to 2,000; and 500 to 1,200 parts by mass of a spherical aluminum oxide powder.

In order to raise the thermal conductivity of a silicone composition, a common method is to more highly fill a polymer with a thermally conductive filler. However, as typified by aluminum oxide (specific gravity 3.9) and zinc oxide (specific gravity 5.6), since a thermally conductive filler has a specific gravity larger than that of a silicone polymer, the specific gravity of the composition tends to increase if the filler content becomes larger and larger. In addition, aluminum oxide has a high Mohs hardness of 9; when kneaded with a silicone resin, abrasion on the inner wall of a reaction oven and stirring blades will progress easily.

In recent years, as for an electric vehicle equipped with a lithium-ion battery, weight saving of the vehicular body overall has been a challenge in order to allow the vehicle to be able to run longer distances. Further, even in the cases of a mobile device and a wearable device that are directly worn by human, the weights thereof are never ignorable. Patent document 5 discloses a silicone composition having a specific gravity of about 2.0, which is prepared by filling a silicone polymer with aluminum hydroxide having a small specific gravity.

PRIOR ART DOCUMENTS

Patent Documents

Patent document 1: JP-A-Sho 47-32400
Patent document 2: JP-A-Sho 56-100849
Patent document 3: JP-A-Hei 1-69661
Patent document 4: JP-A-Hei 4-328163
Patent document 5: JP-A-2011-89079

SUMMARY OF THE INVENTION

Problems to be Solved by the Invention

As for the thermally conductive silicone composition disclosed in Patent document 5, a cured product thereof has a thermal conductivity as low as about 1.5 W/m·K, which is insufficient in terms of reducing the heat generated by the high-capacity devices nowadays. Here, although the thermal conductivity can be further increased by raising the filler content of aluminum hydroxide, pump pressure feeding will be difficult due to a rapid increase in viscosity of the composition.

Further, magnesium oxide is expected to be a filler for a thermally conductive silicone resin due to the fact that the specific gravity thereof is 3.65 which makes magnesium oxide lighter than aluminum oxide, and that magnesium oxide exhibits a thermal conductivity higher than those of aluminum oxide and aluminum hydroxide. However, the problem with magnesium oxide is such that as is the case with aluminum oxide, the viscosity of the composition will significantly increase if highly filled therewith, which will make molding difficult.

The present invention was made in view of the above issues; it is an object of the present invention to provide a thermally conductive silicone composition and a thermally conductive silicone sheet which is a cured product of such composition, of which the composition has a low viscosity and is thus superior in productivity and processability, and the cured product is superior in thermal conductivity and lightweight.

Means to Solve the Problems

The inventors of the present invention diligently conducted a series of studies to achieve the above object, and completed the invention as follows. That is, the inventors found that there can be obtained a low-viscosity thermally conductive silicone composition that is easily processable and can be turned into a cured product satisfying both thermal conductivity and lightweight property, by tactfully combining a surface treatment agent with magnesium oxide, aluminum oxide and aluminum hydroxide of different particle sizes, and then highly filling the composition with them.

Specifically, the present invention is to provide the following thermally conductive silicone composition and thermally conductive silicone sheet.

[1]
A thermally conductive silicone composition comprising:
(A) 100 parts by mass of an organopolysiloxane having at least two alkenyl groups per each molecule;
(B) an organohydrogenpolysiloxane having, per each molecule, at least two hydrogen atoms directly bonded to silicon atoms, the component (B) being in an amount where the number of the hydrogen atoms directly bonded to the silicon atoms is 0.2 to 2.0 times larger than the number of the alkenyl groups in the component (A);
(C) 2,500 to 5,000 parts by mass of a thermally conductive filler containing magnesium oxide, aluminum oxide and aluminum hydroxide;
(D) 100 to 300 parts by mass of a surface treatment agent of the thermally conductive filler, which is a dimethylpolysiloxane with one end of the molecular chain thereof being blocked by a trialkoxy group, as represented by the following general formula (1):

[Chemical formula 1]

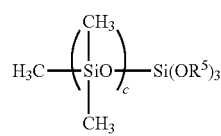

(1)

wherein $R^5$ independently represents an alkyl group having 1 to 6 carbon atoms, and c is an integer of 5 to 100;
(E) a platinum group metal-based curing catalyst in an amount of 0.1 to 1,000 ppm in terms of mass of platinum group metal elements with respect to the component (A); and
(F) an effective amount of an addition reaction control agent, wherein the thermally conductive filler as the component (C) is such that the magnesium oxide is contained by an amount of 20 to 40% by mass per the total amount of the component (C), the aluminum oxide is contained by an amount of 40 to 60% by mass per the total amount of the component (C), and the aluminum hydroxide is contained by an amount of 10 to 30% by mass per the total amount of the component (C).

[2]
The thermally conductive silicone composition according to [1], wherein the thermally conductive silicone composition has a viscosity of 10 to 120 Pa·s.

[3]
The thermally conductive silicone composition according to [1] or [2], wherein the magnesium oxide has an average particle size of 50 to 120 μm.

[4]
The thermally conductive silicone composition according to any one of [1] to [3], wherein the aluminum oxide has an average particle size of 1 to 70 μm.

[5]
The thermally conductive silicone composition according to any one of [1] to [4], wherein the aluminum hydroxide has an average particle size of 1 to 50 μm.

[6]
The thermally conductive silicone composition according to any one of [1] to [5], wherein a cured product of the composition has a density of not higher than 3.0 g/cm$^3$ and a thermal conductivity of not lower than 3.8 W/mK.

[7]
The thermally conductive silicone composition according to any one of [1] to [6], wherein the cured product has an Asker C hardness of not higher than 60.

[8]
A thermally conductive silicone sheet that is a cured product of the thermally conductive silicone composition according to any one of [1] to [7].

Effects of the Invention

The thermally conductive silicone composition of the present invention has a low viscosity and is thus easily processable. Further, since the cured product thereof is superior in thermal conductivity with a thermal conductivity of not lower than 3.8 W/mK, and is lightweight with a density of not higher than 3.0 g/cm$^3$, the thermally conductive silicone composition of the present invention is useful as a heat dissipation material for electric vehicles, mobile devices and wearable devices of which weight saving is desired.

MODE FOR CARRYING OUT THE INVENTION

The thermally conductive silicone composition of the present invention contains, as essential components,
(A) an alkenyl group-containing organopolysiloxane;
(B) an organohydrogenpolysiloxane;
(C) a thermally conductive filler;
(D) a surface treatment agent;
(E) a platinum group metal-based curing catalyst; and
(F) an addition reaction control agent.

Organopolysiloxane

The alkenyl group-containing organopolysiloxane as the component (A) is an organopolysiloxane having at least two silicon atom-bonded alkenyl groups per each molecule, and is the main agent of the composition of the present invention. In general, the main chain moiety thereof is basically composed of repeating diorganosiloxane units; part of the molecular structure may include a branched structure, or the molecular structure may be a cyclic body, yet a linear diorganopolysiloxane is preferred in terms of mechanical strength etc. and property of a cured product.

As a group(s) other than alkenyl group that are to be bonded to the silicon atoms, a substituted or unsubstituted monovalent hydrocarbon group may be selected, examples of which include an alkyl group such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, a decyl group and a dodecyl group; a cycloalkyl group such as a cyclopentyl group, a cyclohexyl group and a cycloheptyl group; an aryl group such as a phenyl group, a tolyl group, a xylyl group, a naphthyl group and a biphenylyl group; an aralkyl group such as a benzyl group, a phenylethyl group, a phenylpropyl group and a methylbenzyl group; and a group obtained by substituting part of or all the hydrogen atoms bonded to the carbon atoms in any of these groups with, for example, halogen atoms such as fluorine, chlorine and bromine atoms or a cyano group, examples of such substituted group including a chloromethyl group, 2-bromoethyl group, 3-chloropropyl group, 3,3,3-trifluoropropyl group, chlorophenyl group, fluorophenyl group, cyanoethyl group and 3,3,4,4,5,5,6,6,6-nonafluorohexyl group. Among them, as a group(s) other than alkenyl group that are to be bonded to the silicon atoms in the organopolysiloxane as the component (A), preferred is a group having 1 to 10, more preferably 1 to 6 carbon atoms; preferred are a substituted or unsubstituted alkyl group having 1 to 3 carbon atoms, such as a methyl group, ethyl group, propyl group, chloromethyl group, bromoethyl group, 3,3,3-trifluoropropyl group and cyanoethyl group; and a substituted or unsubstituted phenyl group such as a phenyl group, chlorophenyl group and fluorophenyl group. Further, the groups other than alkenyl group that are bonded to the silicon atoms may all be identical to one another.

Moreover, as an alkenyl group, there may be listed, for example, those normally having about 2 to 8 carbon atoms, such as a vinyl group, an allyl group, a propenyl group, an isopropenyl group, a butenyl group, a hexenyl group and a cyclohexenyl group, among which a lower alkenyl group such as a vinyl group and an allyl group is preferred, and a vinyl group is particularly preferred. Here, the organopolysiloxane as the component (A) has at least two alkenyl groups per each molecule; in order to improve a flexibility of the cured product obtained, it is preferred that the alkenyl groups are only bonded to the silicon atoms at the molecular chain ends.

A kinetic viscosity of this organopolysiloxane at 25° C. is normally in a rang of 10 to 100,000 mm²/s, particularly preferably 300 to 50,000 mm²/s. When such viscosity is too low, the composition obtained may exhibit a poor preservation stability; and when such viscosity is too high, the composition obtained may exhibit a poor extensibility. Here, the kinetic viscosity is a value measured by an Ostwald viscometer at 25° C.

One kind of such organopolysiloxane as the component (A) may be used alone, or two or more kinds thereof with different viscosities may be used in combination. It is preferred that the component (A) be contained in the composition by an amount of 0.5 to 10% by mass, more preferably 1 to 5% by mass.

Organohydrogenpolysiloxane

The organohydrogenpolysiloxane as the component (B) is an organohydrogenpolysiloxane having, per each molecule, at least 2, preferably 2 to 100 hydrogen atoms that are directly bonded to silicon atoms (Si—H groups), and is a component acting as a cross-linking agent for the component (A). That is, the Si—H groups in the component (B) and the alkenyl groups in the component (A) are added to each other by a hydrosilylation reaction promoted by a later-described platinum group metal-based curing catalyst as the component (E), thereby imparting a crosslinked structure-containing three dimensional network structure to the cured product obtained. Here, if the number of the Si—H groups in the organohydrogenpolysiloxane as the component (B) is not larger than 1, there is a concern that the composition may not be cured.

The average structural formula of the organohydrogenpolysiloxane is expressed as follows.

[Chemical formula 2]

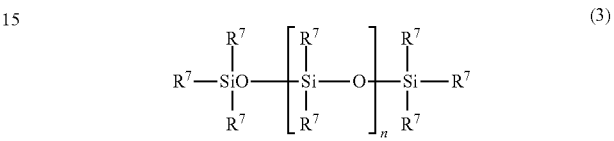

(3)

(In the formula (3), $R^7$ independently represents a hydrogen atom or a substituted or unsubstituted monovalent hydrocarbon group containing no aliphatic unsaturated bonds, provided that at least two $R^7$s are hydrogen atoms; n is an integer of not smaller than 1.)

In the formula (3), as the substituted or unsubstituted monovalent hydrocarbon group containing no aliphatic unsaturated bonds, as represented by $R^7$ which is not a hydrogen atom in such case, there may be listed, for example, an alkyl group such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, a decyl group and a dodecyl group; a cycloalkyl group such as a cyclopentyl group, a cyclohexyl group and a cycloheptyl group; an aryl group such as a phenyl group, a tolyl group, a xylyl group, a naphthyl group and a biphenylyl group; an aralkyl group such as a benzyl group, a phenylethyl group, a phenylpropyl group and a methylbenzyl group; and a group obtained by substituting part of or all the hydrogen atoms bonded to the carbon atoms in any of these groups with, for example, halogen atoms such as fluorine, chlorine and bromine atoms or a cyano group, examples of such substituted group including a chloromethyl group, 2-bromoethyl group, 3-chloropropyl group, 3,3,3-trifluoropropyl group, chlorophenyl group, fluorophenyl group, cyanoethyl group and 3,3,4,4,5,5,6,6,6-nonafluorohexyl group. Among them, as the substituted or unsubstituted monovalent hydrocarbon group containing no aliphatic unsaturated bonds, as represented by $R^7$, preferred is a group having 1 to 10, more preferably 1 to 6 carbon atoms; preferred are a substituted or unsubstituted alkyl group having 1 to 3 carbon atoms, such as a methyl group, ethyl group, propyl group, chloromethyl group, bromoethyl group, 3,3,3-trifluoropropyl group and cyanoethyl group; and a substituted or unsubstituted phenyl group such as a phenyl group, chlorophenyl group and fluorophenyl group. Further, the $R^7$s may all be identical to one another.

In the formula (3), n is an integer of not smaller than 1, preferably an integer of 1 to 200.

The component (B) is to be added in an amount where the number of the Si—H groups derived from the component (B) will be 0.2 to 2.0, preferably 0.3 to 1.5, more preferably 0.5 to 1.0, per 1 alkenyl group derived from the component (A). If the number of the Si—H groups derived from component (B) is smaller than 0.2 per 1 alkenyl group derived from the component (A), the composition may not be cured, or the cured product may exhibit an insufficient strength so that its shape as a molded body cannot be retained to such an extent that the cured product itself may not be able to be handled. Further, if the number of the Si—H groups derived from the component (B) is greater than 2.0 per 1 alkenyl group derived from the component (A), the flexibility of the cured product will be lost such that a significant increase in thermal resistance will be observed.

Thermally Conductive Filler

With regard to the thermally conductive filler as the component (C), the composition of the present invention contains given amounts of three kinds of thermally conductive fillers which are magnesium oxide, aluminum oxide and aluminum hydroxide, in terms of fluidity of the composition as well as thermal conductivity and lightness of the molded product. Here, a thermally conductive filler(s) other than magnesium oxide, aluminum oxide and aluminum hydroxide may be used in combination.

Magnesium oxide is used in an amount of 20 to 40% by mass with respect to the total amount of the component (C). When the amount of magnesium oxide added is smaller than 20% by mass, the cured product (molded body) will exhibit a low thermal conductivity. When the amount of magnesium oxide added is greater than 40% by mass, the viscosity of the thermally conductive silicone composition will increase such that it will be difficult to mold the cured product.

It is preferred that an average particle size of magnesium oxide be 50 to 120 µm, more preferably 50 to 90 µm. Here, the average particle size refers to a particle size at which the amount of the particles with larger particle sizes and the amount of the particles with smaller particle sizes become equal when divided into two at such average particle size after measuring the volumetric distribution of the particles by Microtrac (laser diffraction scattering method). Further, the average particle size(s) referred to in the descriptions below are all defined by such content.

Aluminum oxide is used in an amount of 40 to 60% by mass with respect to the total amount of the component (C). When the amount of aluminum oxide added is smaller than 40% by mass, the surface treatment agent will be less effective such that the viscosity of the thermally conductive silicone composition will increase. When the amount of aluminum oxide added is larger than 60% by mass, the density of the thermally conductive silicone cured product (molded body) will increase, which constitutes a hindrance to weight saving. It is preferred that the average particle size of aluminum oxide be 1 to 70 µm, more preferably 1 to 50 µm.

Aluminum hydroxide is used in an amount of 10 to 30% by mass with respect to the total amount of the component (C). When the amount of aluminum hydroxide added is smaller than 10% by mass, it will be difficult to reduce the weight of the thermally conductive silicone cured product (molded body). When the amount of aluminum hydroxide added is greater than 30% by mass, the thermal conductivity of the thermally conductive silicone cured product (molded body) will be easily impaired. It is preferred that the average particle size of aluminum hydroxide be 1 to 50 µm, more preferably 5 to 20 µm.

A total part by mass of the component (C) is 2,500 to 5,000 parts by mass per 100 parts by mass of the component (A). When such compounding amount is smaller than 2,500 parts by mass, not only the cured product (molded body) obtained will exhibit a small thermal conductivity, but a poor preservation stability will also be exhibited due to the precipitation of the thermally conductive fillers. Further, when such compounding amount is greater than 5,000 parts by mass, the viscosity of the composition will increase, which may significantly worsen pump conveying.

Surface Treatment Agent

When preparing the composition, the surface treatment agent as the component (D) is added for the purpose of uniformly dispersing the thermally conductive filler as the component (C) in the matrix with the component (A) being the main component. The component (D) is a dimethylpolysiloxane with one end of the molecular chain thereof being blocked by a trialkoxy group, as represented by the following general formula (1).

[Chemical formula 3]

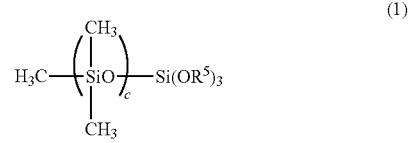

(In the formula (1), $R^5$ independently represents an alkyl group having 1 to 6 carbon atoms; c is an integer of 5 to 100.)

As the alkyl group having 1 to 6 carbon atoms, as represented by $R^5$ in the formula (1), there may be listed, for example, a methyl group, an ethyl group, a propyl group, an isopropyl group, a butyl group, an isobutyl group, a tert-butyl group, a pentyl group, a neopentyl group and a hexyl group, among which a methyl group is preferred.

The component (D) is added in an amount of 100 to 300 parts by mass, particularly preferably 100 to 200 parts by mass, per 100 parts by mass of the component (A). When the amount of the component (D) added is smaller than 100 parts by mass, the dispersibility of the thermally conductive fillers in the thermally conductive silicone composition will be impaired such that the viscosity of the composition will increase. When the amount of the component (D) added is greater than 300 parts by mass, the thermally conductive fillers will thus be diluted such that the thermal conductivity may be impaired.

Platinum Group Metal-Based Curing Catalyst

The platinum group metal-based curing catalyst as the component (E) is a catalyst for promoting the addition reaction between the alkenyl groups derived from the component (A) and the Si—H groups derived from the component (B); a known catalyst for use in hydrosilylation reaction may for example be used. Specific examples thereof include an elemental platinum group metal such as platinum (including platinum black), rhodium and palladium; a platinum chloride, chloroplatinic acid and chloroplatinate, such as $H_2PtCl_4·nH_2O$, $H_2PtCl_6·nH_2O$, $NaHPtCl_6·nH_2O$, $KaHPtCl_6·nH_2O$, $Na_2PtCl_6·nH_2O$, $K_2PtCl_4·nH_2O$, $PtCl_4·nH_2O$, $PtCl_2$, and $Na_2HPtCl_4·nH_2O$ (provided that in these formulae, n is an integer of 0 to 6, preferably 0 or 6); an alcohol-modified chloroplatinic acid (see the specification of U.S. Pat. No. 3,220,972); a complex of chloroplatinic acid and olefin (see the specifications of U.S. Pat. Nos. 3,159,601, 3,159,662 and 3,775,452); a catalyst with a platinum group metal such as platinum black and palladium being supported on a carrier such as aluminum oxide, silica and carbon; a rhodium-olefin complex; chlorotris(triphenylphosphine)rhodium (Wilkinson's catalyst); and a complex of platinum chloride, chloroplatinic acid or chloroplatinate with a vinyl group-containing siloxane, particularly with a vinyl group-containing cyclic siloxane. The component (E) may be used in a so-called catalytic amount; normally, it may be used in an amount of about 0.1 to 1,000 ppm in terms of mass of platinum group metal elements with respect to the component (A).

Addition Reaction Control Agent

As the component (F), the addition reaction control agent used may be any known addition reaction control agent for use in a normal addition reaction-curable silicone composition. For example, there may be listed an acetylene compound such as 1-ethynyl-1-cyclohexanol, 3-butyn-1-ol, and ethynyl methylidene carbinol; a nitrogen compound; an organic phosphorus compound; an oxime compound; and an organic chloro compound. It is desired that the component (F) be used in an amount of about 0.01 to 1 parts by mass per 100 parts by mass of the component (A).

In addition to the above components, the thermally conductive silicone composition of the present invention may further contain an internally added mold release agent, a colorant, an antioxidant and the like, on the premise that the purposes of the present invention will not be impaired. The internally added mold release agent may, for example, be a phenyl-modified silicone such as methylphenylpolysiloxane, and is used in an amount of 1 to 50 parts by mass per 100 parts by mass of the component (A).

Method for Producing Composition

The thermally conductive silicone composition of the present invention is produced by uniformly mixing the abovementioned components. The mixing method may be in accordance with a conventionally known method, and a device used for mixing may for example be a planetary mixer. Further, all the components to be added may be mixed together at one time, or one or more kinds of the components may be mixed in several stages; it is preferred that the components (C) and (D) are added at the same time.

Viscosity of Composition

It is preferred that the viscosity of the thermally conductive silicone composition before curing be 10 to 120 Pa·s, more preferably 30 to 100 Pa·s. When the viscosity of the composition is greater than 120 Pa·s, not only a productivity will be impaired as it now requires a longer period of time to pressure feed a necessary amount via a pump, but pump pressure feeding itself may become difficult. When the viscosity of the composition is lower than 10 Pa s, the composition, when performing molding, may flow out of a mold before being cured, and it may be difficult to maintain a necessary thickness of the composition if a coater is to be used.

Method for Producing Thermally Conductive Silicone Molded Body

A curing condition of the thermally conductive silicone composition may be those similar to the curing condition of a known addition reaction-curable silicone composition; for example, the curing condition thereof may be 100 to 150° C. for 1 to 20 min, preferably 120° C. for 10 min.

Curing is preferably performed in such a manner that the thermally conductive silicone composition of the present invention is to be sandwiched between two pieces of resin film, followed by being treated at 100 to 150° C. for 1 to 20 min with a pressure being applied thereon. By such a kind of method, there can be obtained the thermally conductive silicone molded body of the present invention (e.g. thermally conductive silicone sheet).

As the resin film used, there can be appropriately selected from those capable of enduring the heat treatment after lamination and having a heat distortion temperature of not lower than 100° C., such as films made of PET, PBT or polycarbonate. As a coating device for applying the thermally conductive silicone composition of the present invention to the resin film so that the composition applied will have a uniform thickness, there may be listed, for example, a post-metering blade coater, a gravure coater, a kiss-roll coater and a spray coater.

Thermal Conductivity and Density of Cured Product (Molded Body)

As for the thermal conductivity of the cured product (molded body) of the present invention, it is preferred that a value measured by the hot-disk method at 25° C. be not lower than 3.8 W/mK, more preferably not lower than 4.0 W/mK. When the thermal conductivity is lower than 3.8 W/mK, it will be difficult to apply the cured product to a heat generating body with a large amount of heat generation. Here, there are no particular restrictions on the upper limit of the thermal conductivity of the cured product (molded body); the thermal conductivity of the cured product is not higher than 40 W/mK which is the thermal conductivity of magnesium oxide and is the highest thermal conductivity in the composition.

Further, as for the density of the cured product (molded body) of the present invention, it is preferred that a value measured by an underwater replacement method be not higher than 3.0 g/cm$^3$. Here, there are no particular restrictions on the lower limit of the density of the cured product (molded body); it is normally not lower than 2.4 g/cm$^3$.

The thermal conductivity and density of the cured product (molded body) are values measured with regard to a cured product obtained by treating the thermally conductive silicone composition of the present invention at 120° C. for 10 min.

Working Examples

Preparation of Composition

The components (A) to (F) used in the following working examples are shown below.

Component (A)

Organopolysiloxane represented by the following formula

[Chemical formula 4]

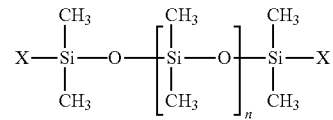

In the above formula, X represents a vinyl group; n is a number yielding a viscosity of 400 mm$^2$/s.

Component (B)

Organohydrogenpolysiloxane represented by the following formula

[Chemical formula 5]

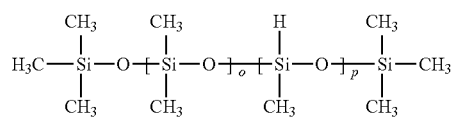

In the above formula, o=28, p=2, each representing an average polymerization degree.

Component (C)

Various thermally conductive fillers whose average particle sizes are as follows.
(C-1) Average particle size: 60 μm: magnesium oxide
(C-2) Average particle size: 90 μm: magnesium oxide
(C-3) Average particle size: 1 μm: aluminum oxide
(C-4) Average particle size: 10 μm: aluminum oxide
(C-5) Average particle size: 70 μm: aluminum oxide
(C-6) Average particle size: 8 μm: aluminum hydroxide
(C-7) Average particle size: 50 μm: aluminum hydroxide Component (D)

Dimethylpolysiloxane with one end of the molecular chain thereof being blocked by a trimethoxy group, as represented by the following formula

[Chemical formula 6]

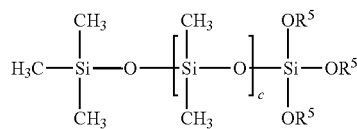

In the above formula, c=30; $R^5$ represents Me (methyl group).

Component (E)

5% solution of chloroplatinic acid in 2-ethylhexanol

Component (F)

Ethynyl Methylidene Carbinol

Working Examples 1 to 8; Comparative Examples 1 to 8

The following components were sequentially added at the compounding ratios shown in Tables 1 and 2. At first, the components (A), (C) and (D) were kneaded by a planetary mixer for 60 min.

The components (E) and (F) were then added to this planetary mixer, and there was also added an effective amount of KF-54 (by Shin-Etsu Chemical Co., Ltd.) which is a phenyl-modified silicone oil serving as an internally added mold release agent for facilitating mold releasing from a separator, followed by performing kneading for another 60 min. The component (B) was further added to this planetary mixer to then perform kneading for another 30 m, thereby obtaining a thermally conductive silicone composition.

Molding Method

The thermally conductive silicone composition thus prepared was then poured into a mold of a size of 60 mm×60 mm×6 mm, and an opening portion of the mold was then sandwiched by two pieces of PET film, followed by using a press molding machine to treat the composition at 120° C. for 10 min so as to cure the same, thereby obtaining a thermally conductive silicone molded body (thermally conductive silicone sheet).

Evaluation Method

Viscosity:

The viscosity of the thermally conductive silicone composition before heating and curing was measured by a viscosity and viscoelasticity measuring device (HAAKE MARS 40/60) at a composition temperature of 25° C. and a shearing speed of 10 $s^{-1}$.

Thermal Conductivity:

Using two pieces of the 6 mm thick thermally conductive silicone molded body obtained, a thermal conductivity meter (TPA-501, product name by Kyoto Electronics Manufacturing Co., Ltd.) was employed to measure the thermal conductivity of the molded body.

Density:

The density of the thermally conductive silicone molded body was measured by an underwater replacement method.

Hardness:

The hardness of the thermally conductive silicone molded body was measured by an Asker C hardness tester stipulated in SRIS0101.

TABLE 1

| Working example | | 1 | 2 | 3 | 4 | 5 | 6 | 7 | 8 |
|---|---|---|---|---|---|---|---|---|---|
| A | | 100 | 100 | 100 | 100 | 100 | 100 | 100 | 100 |
| B | | 18 | 18 | 18 | 18 | 18 | 18 | 18 | 18 |
| C | C-1 | 0 | 1400 | 1600 | 0 | 1400 | 1400 | 1400 | 1400 |
|   | C-2 | 800 | 0 | 0 | 800 | 0 | 0 | 0 | 0 |
|   | C-3 | 1200 | 1420 | 1420 | 1420 | 1420 | 1200 | 1220 | 1420 |
|   | C-4 | 0 | 600 | 600 | 600 | 1000 | 500 | 500 | 600 |
|   | C-5 | 0 | 400 | 0 | 200 | 0 | 0 | 0 | 200 |
|   | C-6 | 300 | 860 | 860 | 860 | 500 | 860 | 700 | 500 |
|   | C-7 | 300 | 0 | 0 | 0 | 0 | 0 | 500 | 0 |
| Total part by mass of C | | 2600 | 4680 | 4480 | 3880 | 4320 | 3960 | 4320 | 4120 |
| Ratio of magnesium oxide (w %) | | 31 | 30 | 36 | 21 | 32 | 35 | 32 | 34 |
| Ratio of aluminum oxide (w %) | | 46 | 52 | 45 | 50 | 56 | 43 | 40 | 50 |
| Ratio of aluminum hydroxide (w %) | | 23 | 18 | 19 | 22 | 12 | 22 | 28 | 12 |
| D | | 140 | 200 | 200 | 200 | 250 | 150 | 200 | 200 |
| E | | 1.0 | 1.0 | 1.0 | 1.0 | 1.0 | 1.0 | 1.0 | 1.0 |
| F | | 0.7 | 0.7 | 0.7 | 0.7 | 0.7 | 0.7 | 0.7 | 0.7 |
| Internally added mold release agent KF-54 | | 20 | 20 | 20 | 20 | 20 | 20 | 20 | 20 |
| Viscosity before curing(Pa · s) | | 109 | 103 | 91 | 111 | 103 | 112 | 114 | 95 |
| Thermal conductivity (W/mK) | | 4.1 | 4.3 | 4.2 | 4.3 | 4.3 | 3.9 | 4.0 | 4.3 |
| Density (g/cm$^3$) | | 2.6 | 2.8 | 2.8 | 2.7 | 2.9 | 2.8 | 2.7 | 3.0 |
| Asker C hardness | | 55 | 28 | 22 | 19 | 11 | 43 | 19 | 24 |

TABLE 2

| Comparative example | | 1 | 2 | 3 | 4 | 5 | 6 | 7 | 8 |
|---|---|---|---|---|---|---|---|---|---|
| A | | 100 | 100 | 100 | 100 | 100 | 100 | 100 | 100 |
| B | | 14 | 18 | 18 | 18 | 18 | 18 | 13 | 18 |
| C | C-1 | 0 | 1400 | 800 | 2000 | 1400 | 0 | 1250 | 0 |
| | C-2 | 800 | 0 | 0 | 0 | 0 | 800 | 0 | 600 |
| | C-3 | 940 | 1420 | 1400 | 1200 | 0 | 2400 | 600 | 1400 |
| | C-4 | 0 | 600 | 1200 | 600 | 1200 | 0 | 1300 | 0 |
| | C-5 | 0 | 800 | 0 | 0 | 0 | 0 | 0 | 0 |
| | C-6 | 300 | 860 | 1000 | 500 | 1000 | 300 | 0 | 0 |
| | C-7 | 300 | 0 | 0 | 0 | 0 | 300 | 0 | 1000 |
| Total part by mass of C | | 2340 | 5080 | 4400 | 4300 | 3600 | 3800 | 3150 | 3000 |
| Ratio of magnesium oxide (w %) | | 34 | 28 | 18 | 47 | 39 | 21 | 40 | 20 |
| Ratio of aluminum oxide (w %) | | 40 | 56 | 59 | 42 | 33 | 63 | 60 | 47 |
| Ratio of aluminum hydroxide (w %) | | 26 | 17 | 23 | 12 | 28 | 16 | 0 | 33 |
| D | | 140 | 200 | 150 | 140 | 200 | 240 | 100 | 150 |
| E | | 1.0 | 1.0 | 1.0 | 1.0 | 1.0 | 1.2 | 1.3 | 1.0 |
| F | | 0.7 | 0.7 | 0.7 | 0.7 | 0.7 | 0.7 | 0.7 | 0.7 |
| Internally added mold release agent KF-54 | | 20 | 20 | 20 | 20 | 20 | 20 | 20 | 20 |
| Viscosity before curing(Pa · s) | | 196 | 135 | 124 | Kneading failed | Kneading failed | 162 | 176 | 172 |
| Thermal conductivity (W/mK) | | 3.7 | 4.7 | 3.6 | | | 3.7 | 4.4 | 3.7 |
| Density (g/cm³) | | 2.7 | 2.8 | 2.9 | | | 3.1 | 3.2 | 2.7 |
| Asker C hardness | | 32 | 36 | 38 | | | 58 | 64 | 44 |

As for the thermally conductive silicone compositions obtained in the working examples 1 to 8 as well as the thermally conductive silicone sheets produced by curing these compositions, since the compositions were highly filled with aluminum oxide, aluminum hydroxide and the surface treatment agent at an appropriate ratio(s), the compositions exhibited viscosities of not higher than 120 Pa·s, and the sheets exhibited thermal conductivities of not lower than 3.8 W/mK and densities of not higher than 3.0 g/cm³.

In the comparative example 1, since the total amount of the thermally conductive fillers was smaller than 2,500 parts by mass, the sheet exhibited a thermal conductivity of lower than 3.8 W/mK, which is not suitable for use in heat dissipation of parts with large amounts of heat generation.

In the comparative example 2, since the total amount of the thermally conductive fillers was larger than 5,000 parts by mass, the composition exhibited a viscosity of greater than 120 Pa·s even when the thermally conductive fillers were added with an appropriate combination.

In the comparative example 3, since the ratio of magnesium oxide was lower than 20 w %, the sheet exhibited a thermal conductivity of lower than 3.8 W/mK.

In the comparative example 4, since the ratio of magnesium oxide was larger than 40 w %, a rise in viscosity was so significant that the composition failed to be kneaded.

In the comparative example 5, since the ratio of aluminum oxide was smaller than 40 w %, the effect of the surface treatment agent was so small that the composition failed to be kneaded.

In the comparative example 6, since the ratio of aluminum oxide was larger than 60 w %, the sheet exhibited a density of greater than 3.0 g/cm³.

In the comparative example 7, since the ratio of aluminum hydroxide was smaller than 10 w %, the sheet exhibited a density of greater than 3.0 g/cm³.

In the comparative example 8, since the ratio of aluminum hydroxide was larger than 30 w %, the sheet exhibited a thermal conductivity of lower than 3.8 W/mK, and the composition exhibited a viscosity of greater than 120 Pa·s.

The invention claimed is:

1. A thermally conductive silicone composition comprising:

(A) 100 parts by mass of a linear organopolysiloxane having at least two alkenyl groups per each molecule and at least one of the at least two alkenyl groups is a vinyl group, and a kinetic viscosity of the linear organopolysiloxane at 25° C. is from 300 to 50,000 mm²/s;

(B) an organohydrogenpolysiloxane having, per each molecule, at least two hydrogen atoms directly bonded to silicon atoms, the component (B) being in an amount where the number of the hydrogen atoms directly bonded to the silicon atoms is 0.2 to 2.0 times larger than the number of the alkenyl groups in the component (A), wherein the organohydrogenpolysiloxane (B) is represented by the following general formula (3):

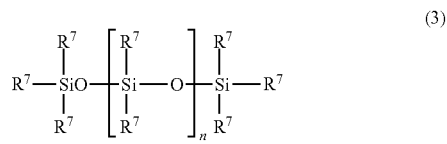

wherein R⁷ independently represents a hydrogen atom, a substituted or unsubstituted alkyl group having 1 to 3 carbon atoms, or a substituted or unsubstituted phenyl group, and n is an integer of from 1 to 200;

(C) 2,600 to 4,680 parts by mass of a thermally conductive filler containing magnesium oxide, aluminum oxide and aluminum hydroxide;

(D) 140 to 250 parts by mass of a surface treatment agent of the thermally conductive filler, which is a dimethylpolysiloxane with one end of the molecular chain thereof being blocked by a trialkoxy group, as represented by the following general formula (1):

[Chemical formula 1]

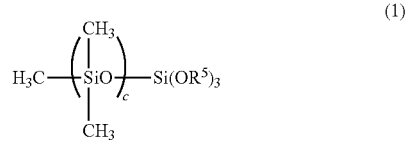

(1)

wherein $R^5$ independently represents an alkyl group having 1 to 6 carbon atoms, and c is an integer of 5 to 100;

(E) a platinum group metal-based curing catalyst in an amount of 0.1 to 1,000 ppm in terms of mass of platinum group metal elements with respect to the component (A); and (F) an effective amount of an addition reaction control agent, wherein the thermally conductive filler as the component (C) is such that the magnesium oxide is contained by an amount of 21 to 36% by mass per the total amount of the component (C), the aluminum oxide is contained by an amount of 40 to 56% by mass per the total amount of the component (C), and the aluminum hydroxide is contained by an amount of 12 to 28% by mass per the total amount of the component (C); and the magnesium oxide has an average particle size of 60 to 90 μm, the aluminum oxide has an average particle size of 1 to 70 μm, and the aluminum hydroxide has an average particle size of 8 to 50 μm.

2. The thermally conductive silicone composition according to claim 1, wherein the thermally conductive silicone composition has a viscosity of 10 to 120 Pa·s.

3. The thermally conductive silicone composition according to claim 1, wherein a cured product of the thermally conductive silicone composition has a density of not higher than 3.0 g/cm³ and a thermal conductivity of not lower than 3.8 W/mK.

4. The thermally conductive silicone composition according to claim 1, wherein a cured product of the thermally conductive silicone composition has an Asker C hardness of not higher than 60.

5. The thermally conductive silicone composition according to claim 1, wherein in the general formula (1) of the surface treatment agent (D), c is an integer of about 30.

6. A thermally conductive silicone sheet that is a cured product of the thermally conductive silicone composition according to claim 1.

* * * * *